US008925566B2

(12) United States Patent
Haller

(10) Patent No.: US 8,925,566 B2
(45) Date of Patent: Jan. 6, 2015

(54) SYSTEM AND METHOD OF ASSURING DROP OUT OF A SOLENOID VALVE

(75) Inventor: John J. Haller, Boonton, NJ (US)

(73) Assignee: Automatic Switch Company, Florham Park, NJ (US)

( * ) Notice: Subject to any disclaimer, the term of this patent is extended or adjusted under 35 U.S.C. 154(b) by 731 days.

(21) Appl. No.: 13/195,743

(22) Filed: Aug. 1, 2011

(65) Prior Publication Data

US 2013/0032739 A1 Feb. 7, 2013

(51) Int. Cl.

| | |
|---|---|
| ***F16K 31/06*** | (2006.01) |
| ***H01H 47/00*** | (2006.01) |
| ***F17D 3/00*** | (2006.01) |
| ***H01F 7/18*** | (2006.01) |

(52) U.S. Cl.

CPC .................................... *H01F 7/1811* (2013.01)
USPC ........................... 137/1; 361/152; 251/129.04

(58) Field of Classification Search

USPC ................... 251/129.04; 361/152, 188; 137/1
See application file for complete search history.

(56) References Cited

U.S. PATENT DOCUMENTS

| | | | | |
|---|---|---|---|---|
| 3,577,040 | A | 5/1971 | Campbell, Jr. et al. | |
| 3,660,730 | A | 5/1972 | Mason | |
| 4,409,639 | A * | 10/1983 | Wesner | 361/167 |
| 4,464,661 | A | 8/1984 | Redmond | |
| 5,784,245 | A * | 7/1998 | Moraghan et al. | 361/154 |
| 6,104,583 | A * | 8/2000 | Wynn et al. | 361/7 |
| 6,338,358 | B1 | 1/2002 | Watanabe et al. | |
| 6,371,573 | B1 | 4/2002 | Goebels et al. | |
| 6,616,121 | B2 * | 9/2003 | Asakura et al. | 251/129.04 |
| 7,073,524 | B2 | 7/2006 | Chian | |
| 2005/0145282 | A1 | 7/2005 | Chian | |
| 2006/0186817 | A1 | 8/2006 | Cascone et al. | |
| 2009/0309054 | A1 | 12/2009 | Haller et al. | |
| 2010/0052637 | A1 * | 3/2010 | Lorentz et al. | 323/282 |
| 2011/0094589 | A1 | 4/2011 | Jacob et al. | |
| 2011/0121217 | A1 | 5/2011 | Ohmi et al. | |
| 2011/0214741 | A1 * | 9/2011 | Fukano et al. | 137/1 |

FOREIGN PATENT DOCUMENTS

| | | |
|---|---|---|
| EP | 2 110 820 | 10/2009 |
| WO | 2011053392 | 5/2011 |

OTHER PUBLICATIONS

Rouzier, B., International Search Report for International Patent Application No. PCT/US2012/046973, European Patent Office, dated Sep. 26, 2012.
Rouzier, B., Written Opinion for International Patent Application No. PCT/US2012/046973, European Patent Office, dated Sep. 26, 2012.

* cited by examiner

*Primary Examiner* — Stephen M Hepperle
*Assistant Examiner* — Seth W Mackay-Smith
(74) *Attorney, Agent, or Firm* — Locke Lord LLP

(57) ABSTRACT

A method of assuring drop out of a valve assembly comprising detecting a level of a signal from the controller; diverting the signal to a solenoid coil of the valve assembly when the level of the signal is above a predetermined value; and diverting the signal to a load when the level of the signal is below the predetermined value. The level detector may divert the signal away from the coil when the level of the signal is below the predetermined value, thereby ensuring that the coil is fully de-energized in response to the level of the signal being below the predetermined value, while allowing current to flow through the valve assembly, thereby allowing the controller to monitor the integrity of the wiring between the controller and the valve assembly.

20 Claims, 7 Drawing Sheets

SYSTEM AND METHOD OF ASSURING DROP OUT OF A SOLENOID VALVE

CROSS REFERENCE TO RELATED APPLICATIONS

None.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to solenoids; and more specifically relate to solenoids used in process control valves.

2. Description of the Related Art

U.S. Pat. No. 3,577,040 discloses an "electronic circuit for actuating a solenoid load from an AC power source in a two-step sequence wherein a high DC voltage is initially applied to "pull-in" the solenoid armature and a lower voltage maintains the armature in a "hold" condition. Silicon-controlled rectifiers (SCR's) provide an electronic switching and rectification of the voltage for operating power. The circuit is controlled by an electrical signal which conditions the SCR's to provide operating voltage during alternate half cycles of the power source and a time delay circuit allows conduction of the "pull-in" SCR for only a few cycles of the power source."

U.S. Pat. No. 3,660,730 discloses a "circuit for initially applying an unusually large drive voltage to a solenoid coil and for subsequently reducing the applied voltage during the travel of the solenoid plunger. The solenoid coil is serially connected to a first transistor circuit operating as an on-off switch and also is serially connected to a second transistor circuit operating to variably control the voltage applied to the solenoid. A capacitor-charge timing circuit controls the variable transistor and thereby gradually reduces the voltage applied to the solenoid."

U.S. Pat. No. 7,073,524 discloses a "fail-safe apparatus for controlling fluid flow through a series arrangement of first and second solenoid-controlled valves is provided. The fail-safe apparatus includes fail-safe circuitry for controlling the operation of the first and second solenoid-controlled valves between unactuated and actuated states. Based on a given duty cycle, the fail-safe circuitry selects, actuates, deactuates, and/or maintains in the actuated or unactuated state one or both of the first and second solenoid-controlled valves. To facilitate such control, the fail-safe circuitry may include a switch operable to couple an input voltage across the first solenoid-controlled valve to cause a first current to flow therein. The fail-safe circuitry may also include an energy-transfer device coupled between the first and second solenoid-controlled valves. Depending of the duty cycle, the energy-transfer device is operable to store a potential therein and/or use the stored potential to assist in controlling the first and second solenoid-controlled valves."

U.S. Patent Application Publication No. 20110094589 discloses a "method of solenoid valve control includes measuring voltage across the solenoid valve and current through the solenoid valve, and using the results to aid in controlling the solenoid valve. For instance, one or both of the measured values may be used to determine when actual engagement of the solenoid valve occurs. An initial lower voltage and lower current can be used, and then as conditions change, the changes in condition can be accounted for by increasing voltage and current to maintain the desired response time of the solenoid valve. By measuring and controlling voltage and current less of a margin can be used, both in setting voltage/current levels and in selecting the time over which a pull voltage/current is utilized. This reduces the wasted energy in the system, as well as reducing the temperature rise in the solenoid valve."

Patent No. WO2011053392A1 discloses a "method of controlling a solenoid valve (12) includes the steps of: initiating engagement of the solenoid valve by applying to the solenoid valve either a pull-in voltage or a pull-in current; during the applying, monitoring at least one of average voltage across the solenoid valve (40) or current through the solenoid valve (50); from the monitoring, determining completion of engagement of the solenoid valve; and after the determining, reducing either the pull-in voltage to a hold voltage, or the pull-in current to a hold current."

The inventions disclosed and taught herein are directed to an improved system and method for assuring drop out of a solenoid valve.

BRIEF SUMMARY OF THE INVENTION

A method of assuring drop out of a valve assembly comprising detecting a level of a signal from the controller; diverting at least a portion of the signal from the controller to a solenoid coil of the valve when the level of the signal is above a predetermined value; and diverting at least a portion of the signal from the controller to a load when the level of the signal is below the predetermined value. The predetermined value may be about 10 volts or between 5 and 10 volts. The level detector may divert all or a portion of the signal from the controller away from the load when the level of the signal is above the predetermined value, thereby minimizing power waste when the controller actuates the valve assembly. The level detector may divert all or a portion of the signal from the controller away from the coil when the level of the signal is below the predetermined value, thereby ensuring that the coil is fully de-energized in response to the level of the signal from the controller being below the predetermined value, while allowing a current of the signal to flow through the valve assembly, thereby allowing the controller to monitor a wiring integrity between the controller and the valve assembly.

A system for assuring drop out of a valve assembly comprising a process control valve; a solenoid coil configured to selectively actuate the control valve upon receipt of an actuation signal from a controller; a load to sink a wiring integrity signal from the controller; and a level detector that monitors a control signal from the controller and determines whether the control signal from the controller constitutes the actuation signal or the wiring integrity signal. The level detector may be configured to divert the actuation signal to the solenoid coil and/or away from the load. The level detector may be configured to divert the wiring integrity signal to the load and/or away from the coil.

A system for assuring drop out of a valve assembly comprising a controller configured the control a process using the valve assembly and wiring between the controller and the valve assembly, the controller configured to generate a control signal; and the valve assembly comprising a process control valve configured to influence the process according to the control signal; a level detector configured to monitor the signal from the controller and determine whether the signal from the controller is above a predetermined value a solenoid coil configured to selectively actuate the control valve upon receipt of the signal from the controller above the predetermined value; and a load to sink the signal from the controller below the predetermined value. The level detector may be configured to divert the signal to the solenoid coil and/or away from the load if the signal from the controller is above the predetermined value. The level detector may be further configured to divert the signal to the load and/or away from the coil if the signal from the controller is below the predetermined value.

DETAILED DESCRIPTION OF THE INVENTION

Figure 1:
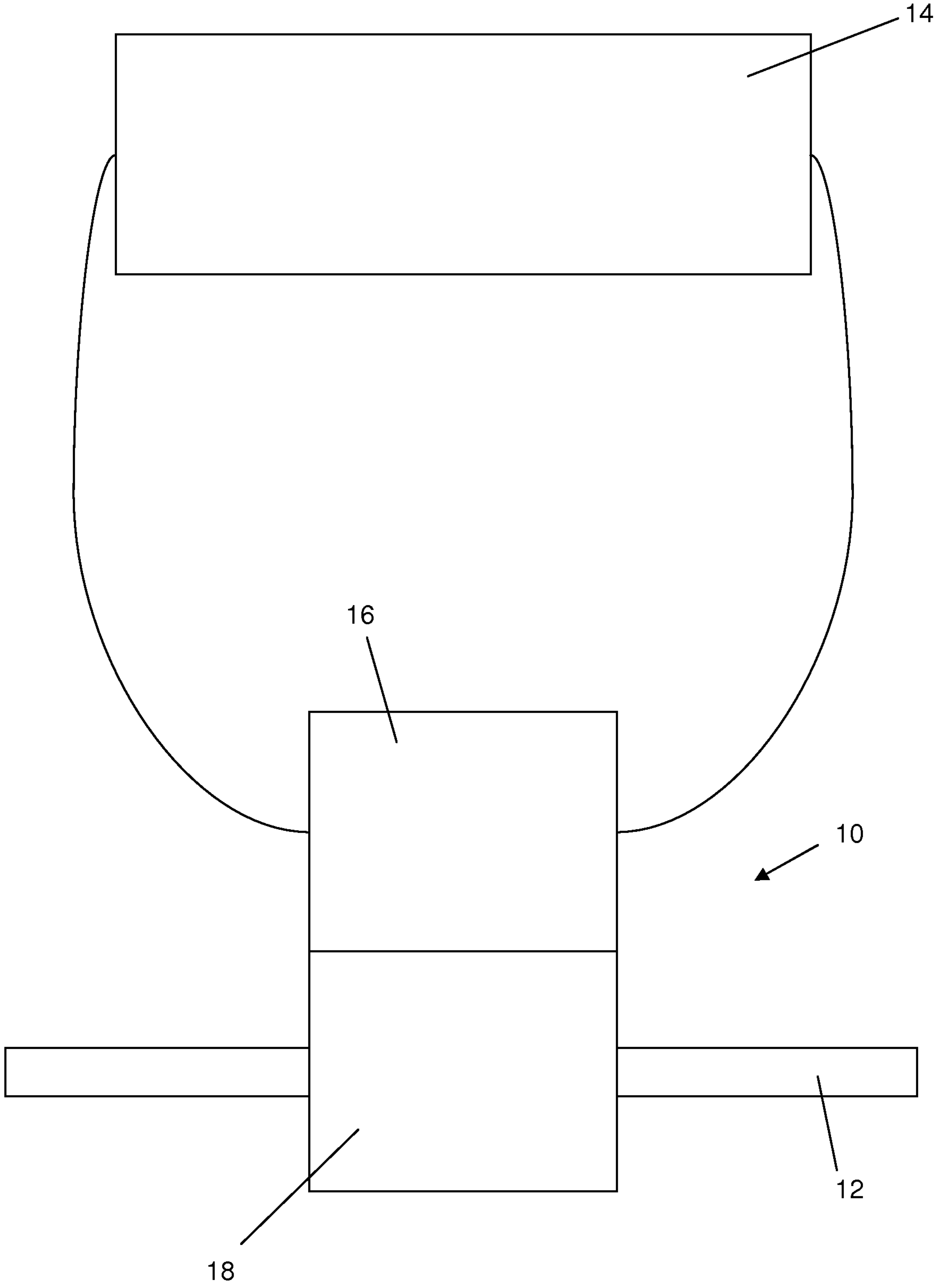
FIG. 1 illustrates a simplified block diagram of a particular embodiment of a system for process control utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a method of assuring drop out of a valve assembly comprising detecting a level of a signal from the controller; diverting at least a portion of the signal from the controller to a solenoid coil of the valve when the level of the signal is above a predetermined value; and diverting at least a portion of the signal from the controller to a load when the level of the signal is below the predetermined value. The predetermined value may be about 10 volts or between 5 and 10 volts. The level detector may divert all or a portion of the signal from the controller away from the load when the level of the signal is above the predetermined value, thereby minimizing power waste when the controller actuates the valve assembly. The level detector may divert all or a portion of the signal from the controller away from the coil when the level of the signal is below the predetermined value, thereby ensuring that the coil is fully de-energized in response to the level of the signal from the controller being below the predetermined value, while allowing a current of the signal to flow through the valve assembly, thereby allowing the controller to monitor a wiring integrity between the controller and the valve assembly.

Applicants have also created a system for assuring drop out of a valve assembly comprising a process control valve; a solenoid coil configured to selectively actuate the control valve upon receipt of an actuation signal from a controller; a load to sink a wiring integrity signal from the controller; and a level detector that monitors a control signal from the controller and determines whether the control signal from the controller constitutes the actuation signal or the wiring integrity signal. The level detector may be configured to divert the actuation signal to the solenoid coil and/or away from the load. The level detector may be configured to divert the wiring integrity signal to the load and/or away from the coil.

Applicants have also created a system for assuring drop out of a valve assembly comprising a controller configured the control a process using the valve assembly and wiring between the controller and the valve assembly, the controller configured to generate a control signal; and the valve assembly comprising a process control valve configured to influence the process according to the control signal; a level detector configured to monitor the signal from the controller and determine whether the signal from the controller is above a predetermined value a solenoid coil configured to selectively actuate the control valve upon receipt of the signal from the controller above the predetermined value; and a load to sink the signal from the controller below the predetermined value. The level detector may be configured to divert the signal to the solenoid coil and/or away from the load if the signal from the controller is above the predetermined value. The level detector may be further configured to divert the signal to the load and/or away from the coil if the signal from the controller is below the predetermined value.

FIG. 1 is an illustration of a valve assembly 10 according to certain aspects of the present inventions. The valve assembly 10 preferably controls flow of a process control media, such as a liquid or gas, through a process control line 12, as directed by a process control controller 14. More specifically, the controller 14 is preferably electrically coupled to the valve assembly 10, in order to allow and/or prevent flow of the media through the process control line 12 by commanding the valve assembly 10 to open and/or close. The controller 14 controls the valve assembly 10 by selectively electrically energizing a solenoid module 16 the physically opens and/or closes a process control valve 18, which in turn allows and/or prevents flow of the media through the process control line 12.

Some controllers 14 do not completely drop the power, voltage and/or current, that they supply to the valve assembly 10, when the controller 14 commands the valve assembly 10 to return to its normal state. More specifically, the valve assembly 10 may function as a normally open valve, in which case it allows the flow of the media through the process control line 12 in the absence of energizing power from the controller 14, or a normally closed valve, in which case it prevents the flow of the media through the process control line 12 in the absence of energizing power from the controller 14. To close a normally open valve assembly 10, or open a normally closed valve assembly 10, the controller 14 energizes the solenoid module 16, which in turn physically shifts the control valve 18. In order to return to the valve assembly's 10 normal position, open or closed, the controller 14 energizes the solenoid module 16, or stops providing full power, voltage and/or current to the valve assembly 10.

Some controllers 14 completely drop the power, voltage and/or current that they supply to the valve assembly 10 to zero, when they command the valve assembly 10 to return to the normal state. However, some controllers 14 merely drop the power, voltage and/or current that they supply to the valve assembly 10 to a less than full power value, when they command the valve assembly 10 to return to the normal state. More specifically, some controllers 14 do not drop the power, voltage and/or current that they supply to the valve assembly 10 to zero, when they command the valve assembly 10 to return to the normal state. Rather, some controllers 14 still supply some power, voltage and/or current to the valve assembly 10 to zero, when they command the valve assembly 10 to return to the normal state.

Figure 2:
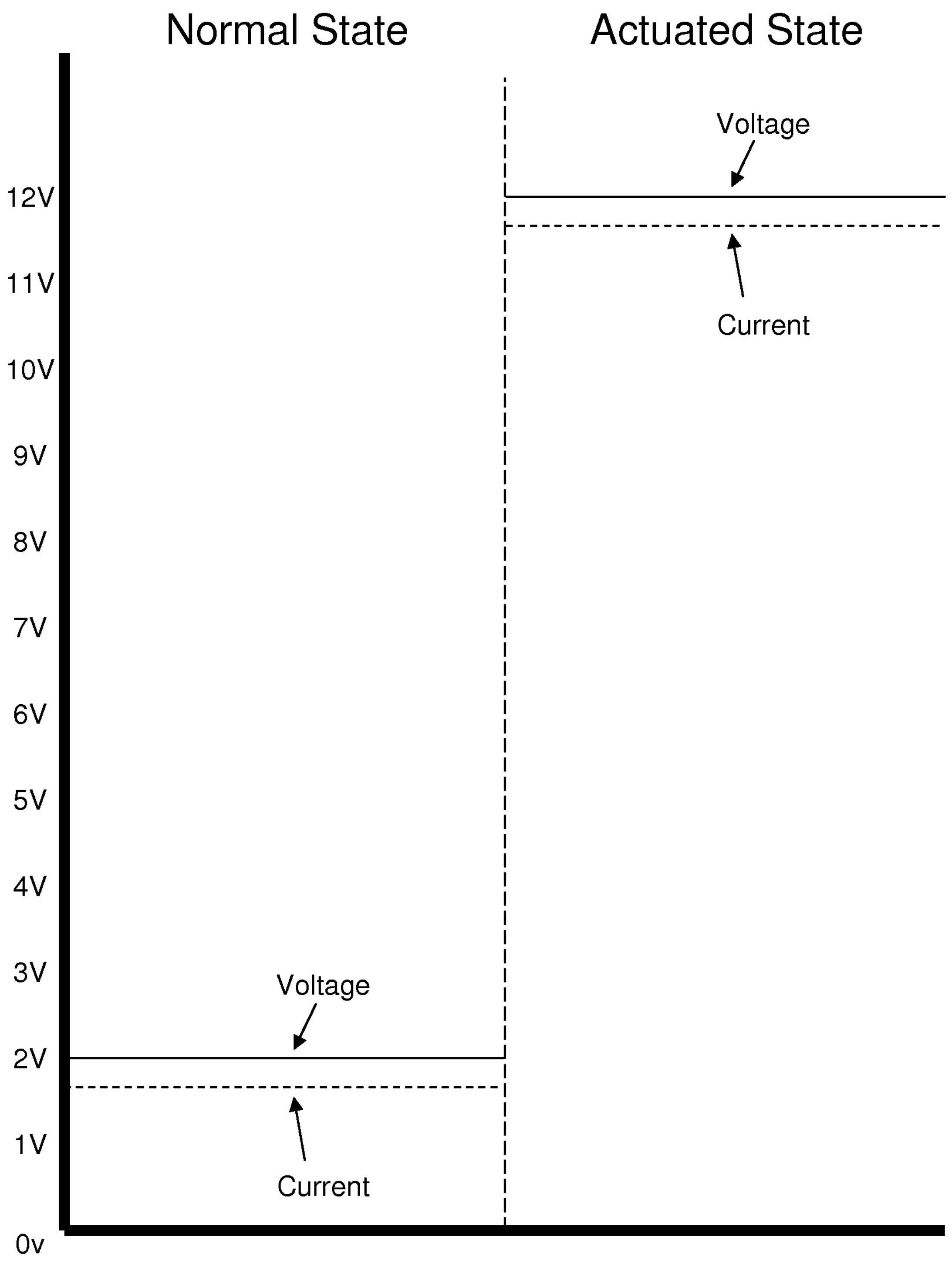
FIG. 2 illustrates exemplary control signal levels that may be used with the system of FIG. 1.

For example, referring also to FIG. 2, there are systems with controllers 14 that allow a small supervisory current to flow in the normal or powered down state. More specifically, it can be seen in FIG. 2 that the controller 14 supplies about twelve volts, with an associated current, to the valve assembly 10 in order to command the valve assembly 10 to actuate, that is to say open, in the case of a normally closed valve assembly 10, or close, in the case of a normally open valve assembly 10. As mentioned, some controllers 14 would supply zero voltage and current, in order to command the valve assembly 10 to return to its normal state.

As also mentioned, some controllers 14 would supply a lesser voltage and current, such as the two volts shown at an associated, in order to command the valve assembly 10 to return to its normal state. This normal state, or residual, power, voltage, or current may be used to allow the controller 14 to confirm that the wiring and connections in the system are intact and functional. Failure to pass power, voltage, or current in this loop will result in some form of system alarm that notifies operators that there is a potential problem with the operation of the system, wiring, and/or connections controlling the valve assembly 10.

Figure 3:
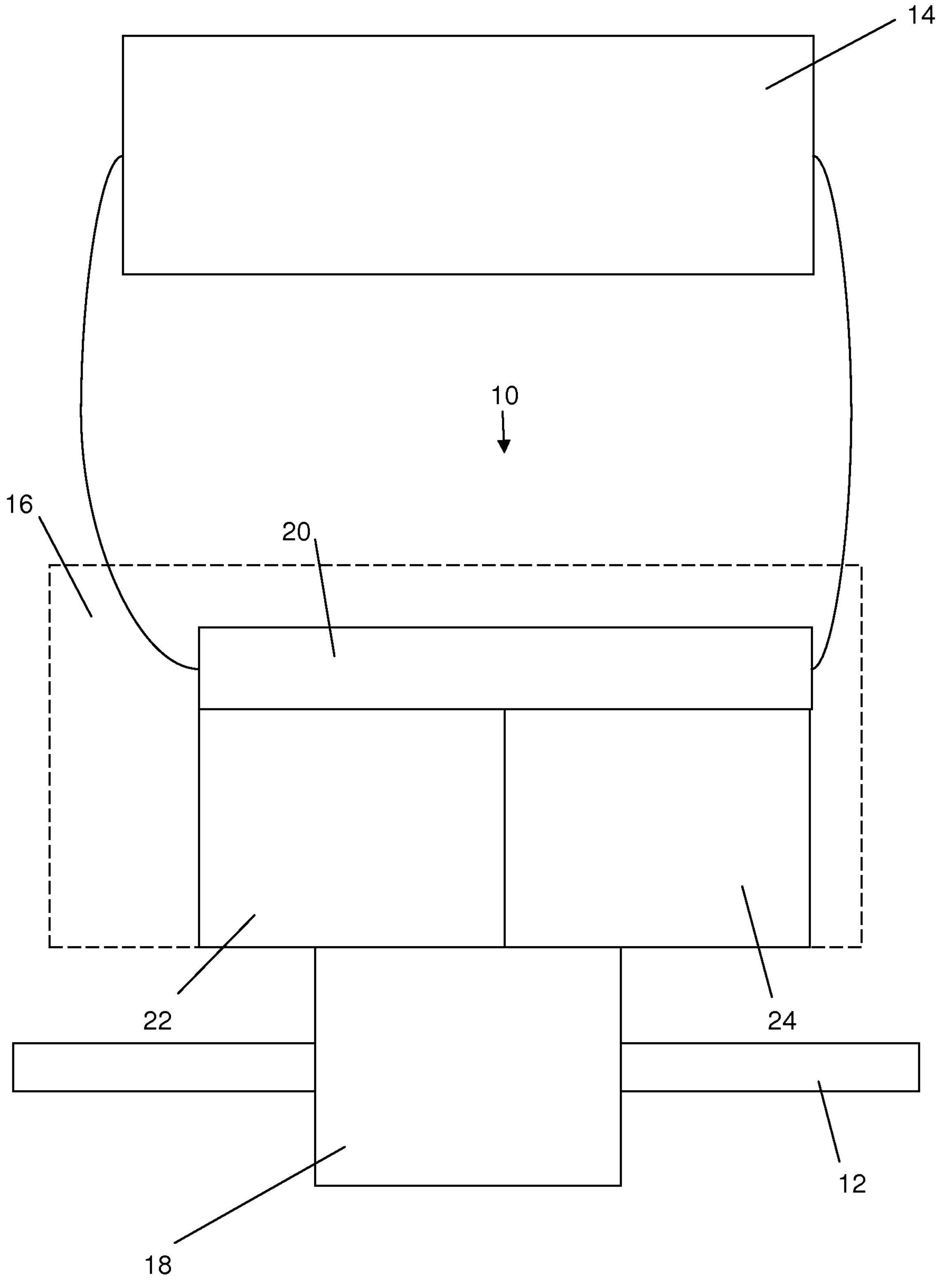
FIG. 3 illustrates a simplified block diagram of a solenoid valve utilizing certain aspects of the present inventions.

Referring also to FIG. 3, in order to accomplish this functionality, a solenoid module 16 utilizing certain aspects of the present invention may be utilized. The solenoid module 16 may have a level detector 20 that monitors and directs the power, voltage, and/or current from the controller 14. For example, the level detector 20 may direct high power, voltage, and/or current from the controller 14 to a solenoid coil 22, which actuates the control valve 18. The level detector 20 may also direct low power, voltage, and/or current from the controller 14 to a load 24, which allows the controller 14 to verify the wiring between the controller 14 and the solenoid module 16 while ensuring that the solenoid coil 22 is sufficiently de-energized to reliably return the valve assembly 10 to its normal state.

Figure 4:
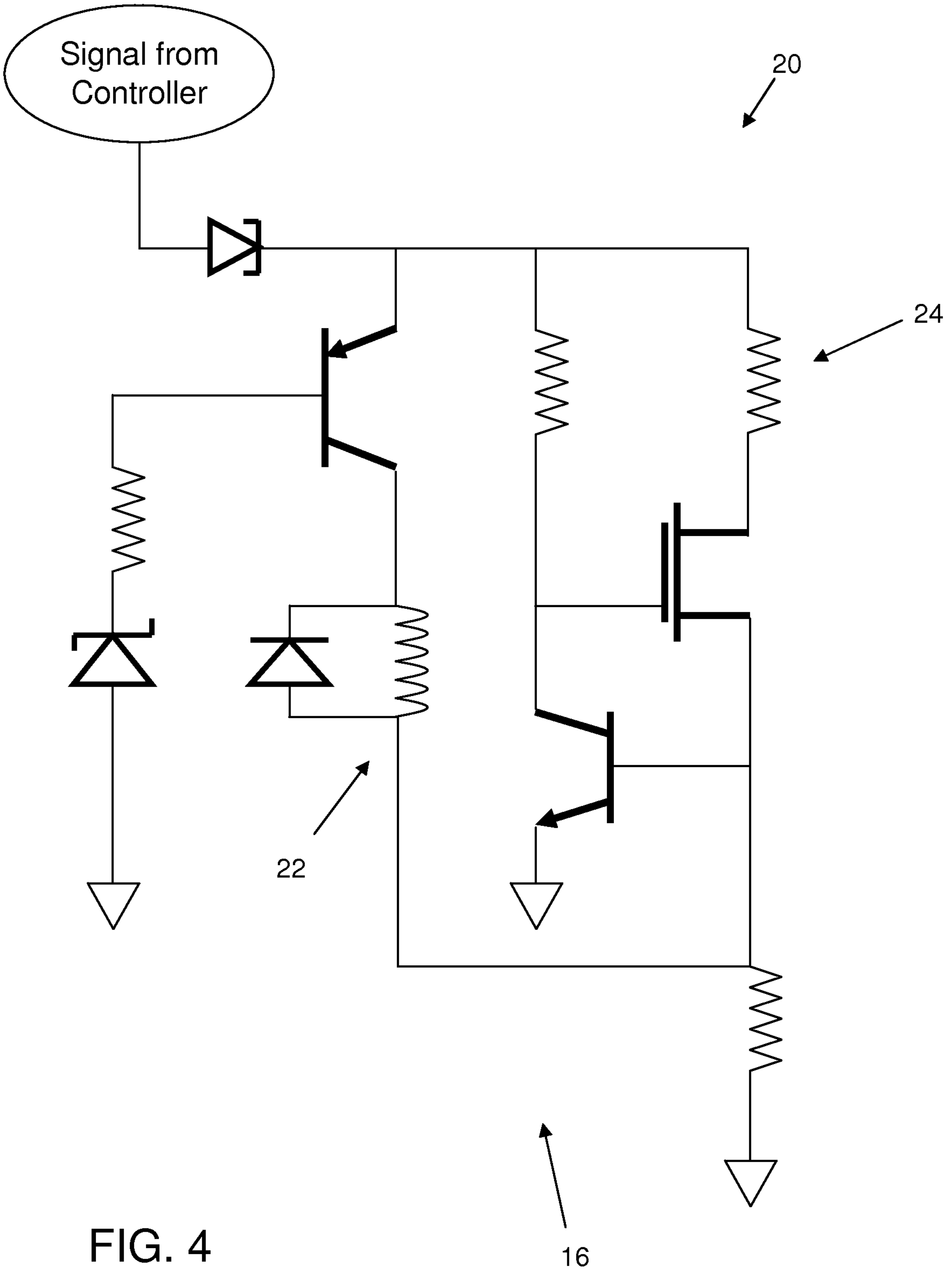
FIG. 4 illustrates a schematic of a particular embodiment of a solenoid module for use with the solenoid valve of FIG. 3 and/or the process control system of FIG. 1 utilizing certain aspects of the present inventions.

FIG. 4 illustrates a specific embodiment of the solenoid module 16 utilizing certain aspects of the present invention. As shown, the level detector 20 may comprise a circuit including various resistors, diodes, and transistors that shift current flow depending on the level of the power, voltage, and/or current from the controller 14.

Figure 5:
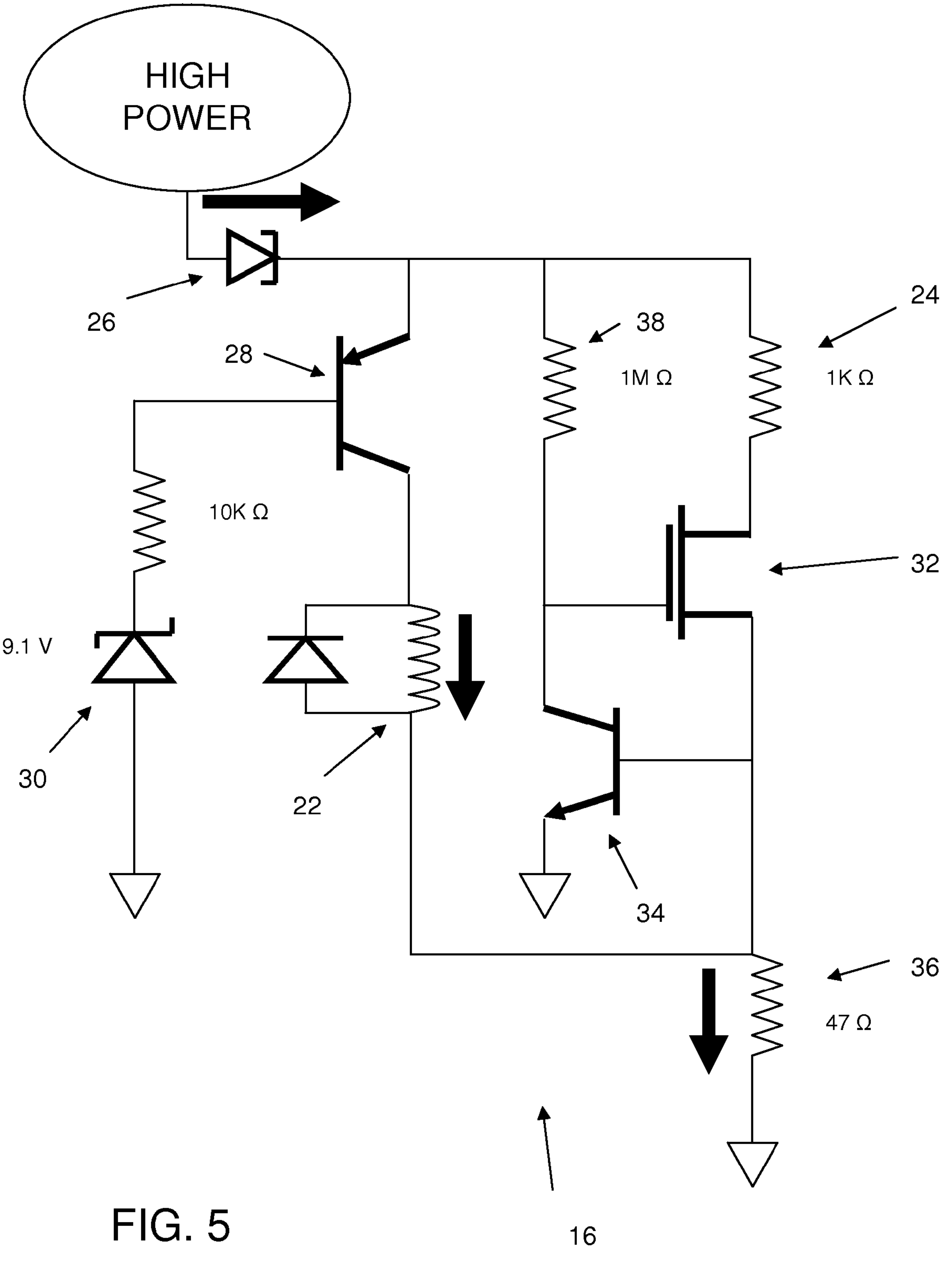
FIG. 5 is the schematic diagram of FIG. 4 showing current flow associated with a high power control signal utilizing certain aspects of the present inventions.

Referring also to FIG. 5, a high power, voltage, and/or current signal from the controller 14 will now be explained. The high power signal from the controller 14 flows though a first diode 26. A majority of the high power signal from the controller 14 then flows down through the first bi-polar junction transistor (BJT) 28. Some of that signal is diverted through the base of the first BJT reverse biasing a second diode 30, such as a zener diode. The remainder of the signal flowing through the first BJT 28 then flows through the solenoid coil 22, thereby actuating the valve assembly 10. In the example shown, the second diode is a zener diode rated at 9.1 volts. Thus, the signal from the controller 14 must be about ten volts, or greater, in order to energize the solenoid coil 22. More specifically, there is about a one volt drop across the first diode 26 and first BJT 28. The second diode 30 holds the base of the first BJT 28 at about 9.1 volts. Thus, for there to be current flow through the first BJT 28 to the solenoid coil 22, the signal from the controller 14 must be about ten volts, or greater. If the signal from the controller 14 is less than about 10 volts, in the specific embodiment shown, the voltage drops incurred at the first diode 26 and the first BJT 28 will reduce the voltage of the signal from the controller 14, as seen at the base of the first BJT 28, to less than the reverse break down voltage of the second diode 30, thereby blocking current flow through the first BJT 28 to the solenoid coil 22.

Figure 6:
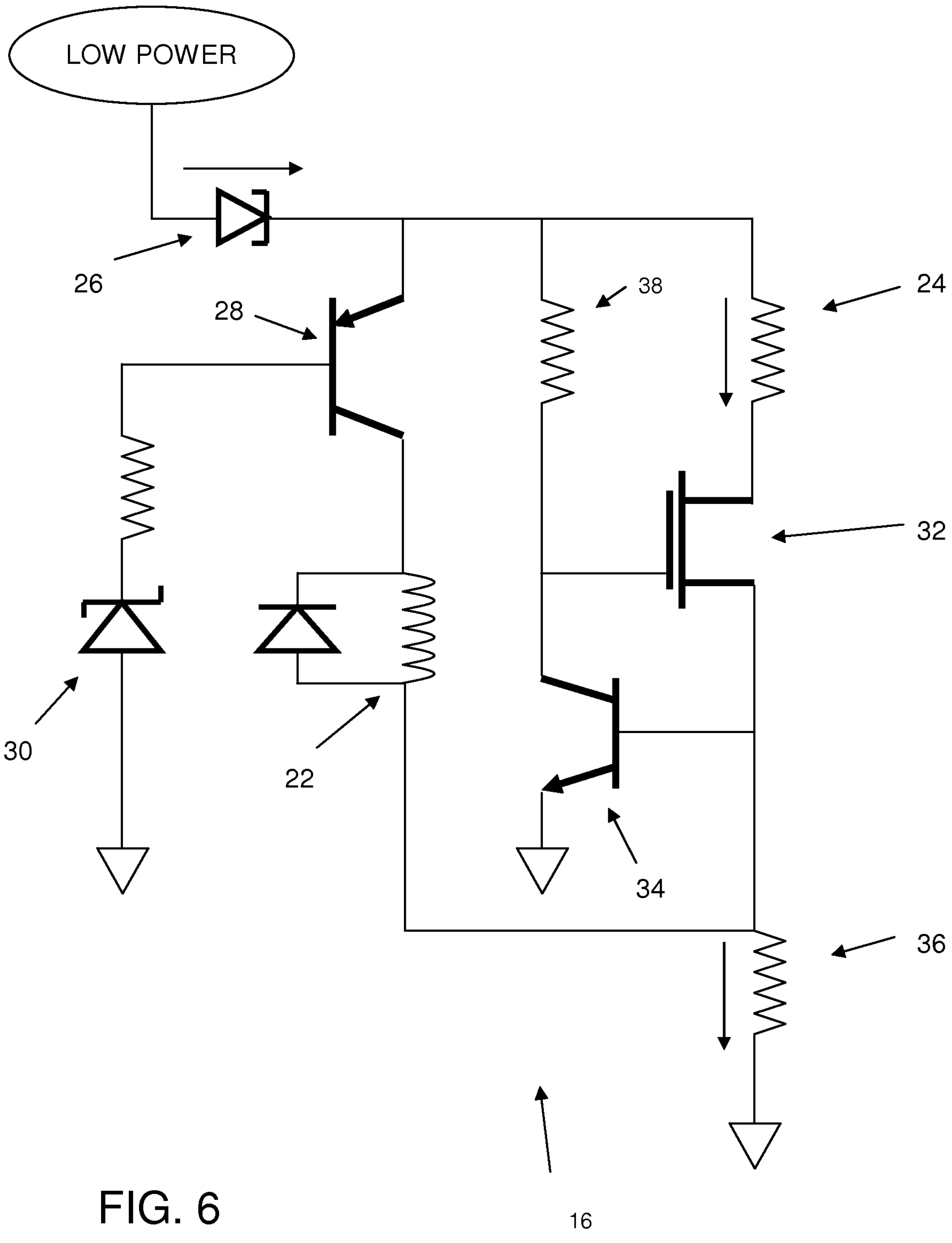
FIG. 6 is the schematic diagram of FIG. 4 showing current flow associated with a low power control signal utilizing certain aspects of the present inventions.

Of course, the exact selection of the first and second diodes 26, 30 and first BJT 28 will control the minimum value that the high power signal can be, in order to reliably energize the solenoid coil 22, thereby actuating the valve assembly 10. For example, selecting the first diode 26 and first BJT 28 to have low voltage drops, or even omitting the first diode 26, will permit the solenoid coil 22 to be energized with signals from the controller 14 closer to the rating of the second diode 30. Likewise, selecting a zener diode with a lower reverse breakdown voltage for the second diode will also lower the minimum value that the high power signal can be, in order to reliably energize the solenoid coil 22, thereby actuating the valve assembly 10.

Where the signal from the controller 14 is less than about 10 volts, referring also the FIG. 6, the voltage drops across the first and second diodes 26, 30 and first BJT 28 will prevent current flow through the first BJT 28 and the solenoid coil. But, as mentioned above, a wiring integrity monitoring signal from the controller 14 through the valve assembly 10 may be desirable to monitor and ensure the integrity of the wiring between the controller 14 and the valve assembly 10. Thus, this lower power signal from the controller 14 is diverted to the load 24, such as a load resistor. In one specific embodiment, a gate of a field effect transistor (FET) 32, such as a BSS138 enhancement mode metal oxide semiconductor field effect transistor (MOSFET) available from Fairchild Semiconductor, is pushed above the threshold voltage by a second BJT 34, thereby biasing the FET 32 and drawing the low power signal from the controller 14 through the load resistor 24.

The current drawn through the load resistor 24 and the FET 32 is limited by the interaction between the second BJT 34 and a control resistor 36. For example, the higher the currently flowing through the control resistor 36, the higher the voltage across the control resistor 36. A higher voltage across the control resistor 36 biases the second BJT 34 to a greater degree, thereby drawing more current through the second BJT 34, which in turn draws more current through a FET biasing resistor 38. As more current flows through the FET biasing resistor 38, the voltage at the gate of the FET 32 drops, thereby shutting off the FET 32 and stopping current flow through the load resistor 24.

This is also how the present invention prevents wasteful current flow through the load resistor 24, when the controller 14 sends a high power signal to the valve assembly 10, meant to actuate the valve assembly. More specifically, as can be seen, current flowing through the solenoid coil 22 also flows though the control resistor 36, thereby raising the base voltage of the second BJT 34 and biasing the second BJT 34 to a greater degree. This draws more current through the second BJT 34, which in turn draws more current through a FET biasing resistor 38, thereby dropping the voltage at the gate of the FET 32 drops, shutting off the FET 32, and stopping current flow through the load resistor 24.

In this manner, the present invention allows the controller 14 to send a low power signal through the wiring to the valve assembly 10, thereby monitoring the integrity of the wiring between the controller 14 and the valve assembly 10. At the same time, the present invention still ensures that the solenoid coil will be de-energized, thereby ensuring that the valve assembly will reliably return to the normal state, in the face of this low power signal wiring integrity monitoring signal. On the other hand, the present invention allows the controller 14 to send a high power signal through the wiring to the valve assembly 10, thereby actuating the valve assembly 10 without wasteful current through the load resistor 24. Thus, it can be seen that the solenoid module 16 of the present invention actually and efficiently diverts the high power, actuation signal from the controller 14 to the solenoid coil 22 and actually and efficiently diverts the low power, wiring integrity monitoring signal from the controller 14 to the load resistor 24.

Other and further embodiments utilizing one or more aspects of the inventions described above can be devised without departing from the spirit of Applicant's invention. For example, the various methods and embodiments of the present invention can be included in combination with each other to produce variations of the disclosed methods and embodiments. Additionally, other circuit designs may be used. Furthermore, other voltage levels, such as six volts or eight volts, or voltage ranges, such as between five and ten volts may be used as the predetermined voltage at which the system switches between the actuated state and the normal state.

For example, the ten volt predetermined voltage value is expected to work well with a solenoid coil 22 that is rated for twenty-four volts direct current (DC). However, the predetermined voltage value, at which the level detector 20 switches, may be changed according to a nominal coil voltage, such that this switching point will be some fraction of the nominal coil voltage. The switching functionality of the level detector 20 may be provided by, or with the assistance of, a microprocessor and supporting circuitry.

Figure 7:
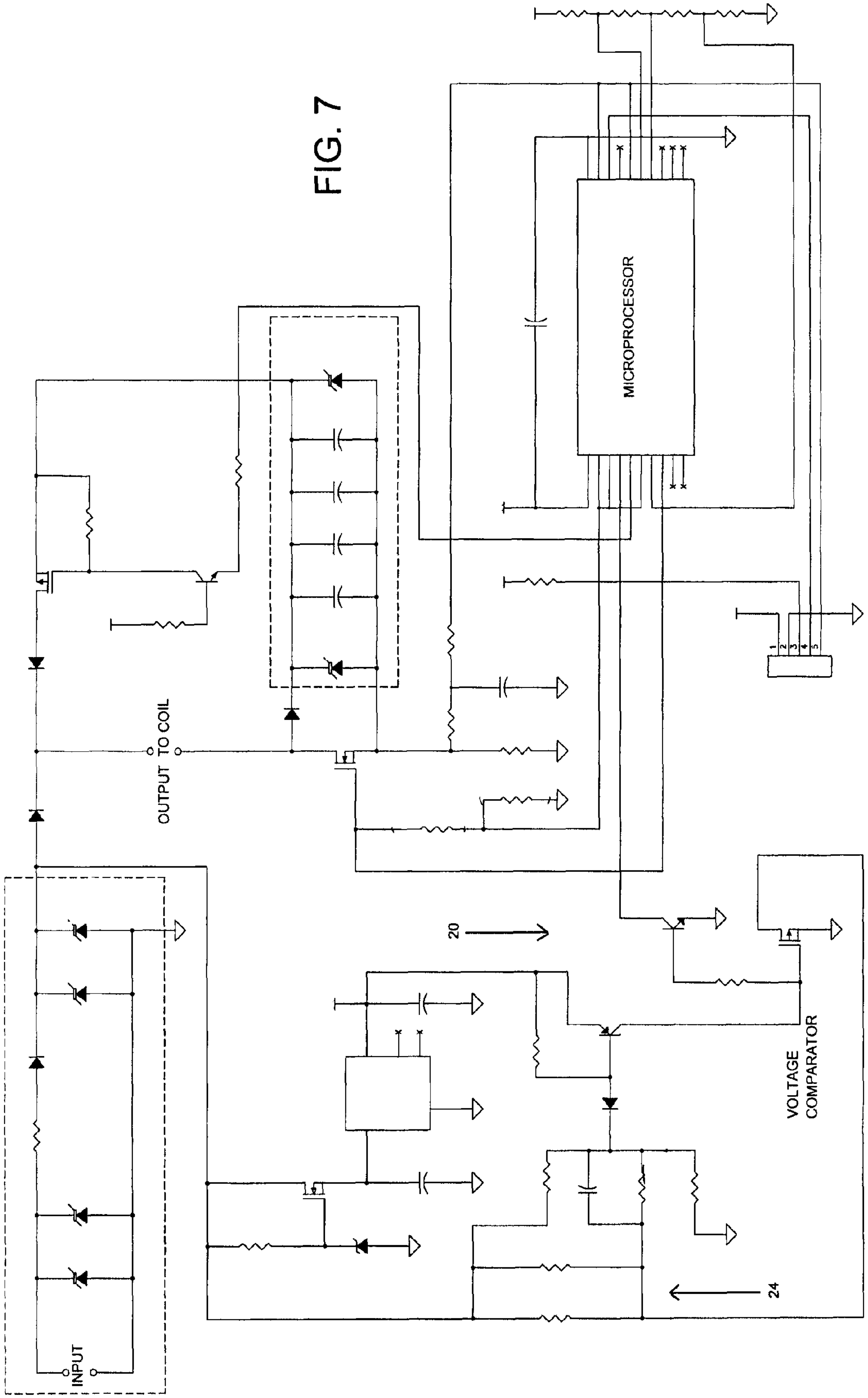
FIG. 7 illustrates a schematic of a microprocessor embodiment of portions of a solenoid module for use with the solenoid valve of FIG. 3 and/or the process control system of FIG. 1 utilizing certain aspects of the present inventions.

For example, referring also to FIG. 7, a voltage comparator may be monitored by the microprocessor which in turn causes one or more load resistors 24 to be connected across the input when the input is at or below a 10.5 volt predetermined switching voltage or value. When the input is at or above the 10.5 volt predetermined switching value, the microprocessor may divert the input signal to the solenoid coil 22 (see FIG. 3) and/or trigger logic to charge the capacitors and open the valve 18 (see FIG. 3).

Configurations such as this may be configured to provide some hysteresis, and/or range to the predetermined switching voltage value, such that the input is diverted to the coil 22 (see FIG. 3) when the input rises above 10.5 volt and the input is diverted to the load resistors 24 when the input falls below about eight volts. This would prevent inadvertent cycling of the solenoid coil 22 (see FIG. 3), and thus the control valve 18 (see FIG. 3), due to fluctuations in the input signal.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Discussion of singular elements can include plural elements and vice-versa.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of assuring drop out of a valve assembly, the method comprising the steps of:

receiving, at the valve assembly, a signal from a controller;

detecting a level of the signal from the controller;

diverting, in response to the level of the signal from the controller being above a predetermined value, at least a portion of the signal from the controller to a solenoid coil of the valve assembly, the level of the signal diverted to the solenoid coil being above the predetermined value; and diverting, in response to the level of the signal from the controller being below the predetermined value, at least a portion of the signal from the controller to a load, the level of the signal diverted to the load being below the predetermined value, wherein a level detector determines whether the signal from the controller is above the predetermined value before the signal is received by the solenoid coil or the load.

2. The method of claim 1, wherein the predetermined value is about 10 volts.

3. The method of claim 1, wherein the predetermined value is between 5 and 10 volts.

4. The method of claim 1, further including diverting at least a portion of the signal from the controller away from the load when the level of the signal is above the predetermined value.

5. The method of claim 1, further including diverting all of the signal from the controller away from the load when the level of the signal is above the predetermined value.

6. The method of claim 1, further including diverting the signal from the controller away from the load when the level of the signal is above the predetermined value, thereby minimizing power waste when the controller actuates the valve assembly.

7. The method of claim 1, further including diverting at least a portion of the signal from the controller away from the coil when the level of the signal is below the predetermined value.

8. The method of claim 1, further including diverting all of the signal from the controller away from the coil when the level of the signal is below the predetermined value.

9. The method of claim 1, further including diverting all of the signal from the controller away from the coil when the level of the signal is below the predetermined value, thereby ensuring that the coil is fully de-energized in response to the level of the signal from the controller being below the predetermined value, and allowing a current of the signal to flow through the valve assembly, thereby allowing the controller to monitor a wiring integrity between the controller and the valve assembly.

10. The method of claim 1, further including sending the signal from the controller to the valve assembly at a high level above the predetermined value in order to actuate the valve assembly and sending the signal from the controller to the valve assembly at a low level below the predetermined value in order to return the valve assembly to a normal state.

11. A system for assuring drop out of a valve assembly comprising:

a process control valve;

a solenoid coil configured to selectively actuate the control valve upon receipt of an actuation signal from a controller;

a load to sink a wiring integrity signal from the controller; and a level detector that monitors a control signal from the controller and determines whether the control signal from the controller constitutes the actuation signal or the wiring integrity signal before the control signal is received by the solenoid coil or the load.

12. The system of claim 11, wherein the level detector is further configured to divert the actuation signal to the solenoid coil.

13. The system of claim 11, wherein the level detector is further configured to divert the actuation signal away from the load.

14. The system of claim 11, wherein the level detector is further configured to divert the wiring integrity signal to the load.

15. The system of claim 11, wherein the level detector is further configured to divert the wiring integrity signal away from the coil.

16. The system of claim 11, wherein the level detector is further configured to divert the signal to the solenoid coil if the signal from the controller is above the predetermined value.

17. The system of claim 11, wherein the level detector is further configured to divert the signal away from the load if the signal from the controller is above the predetermined value.

18. The system of claim 11, wherein the level detector is further configured to divert the signal to the load if the signal from the controller is below the predetermined value.

19. The system of claim 11, wherein the level detector is further configured to divert the signal away from the coil if the signal from the controller is below the predetermined value.

20. A system for assuring drop out of a valve assembly comprising:

a controller configured—to—control a process using the valve assembly and wiring between the controller and the valve assembly, the controller configured to generate a control signal; and the valve assembly comprising— a process control valve configured to influence the process according to the control signal;

a level detector configured to monitor the signal from the controller and determine whether the signal from the controller is above a predetermined value;

a solenoid coil configured to selectively actuate the control valve upon receipt of the signal from the controller above the predetermined value; and a load to sink the signal from the controller below the predetermined value;

wherein the level detector determines whether the signal from the controller is above the predetermined value before the control signal is received by the solenoid coil or by the load.

* * * * *